United States Patent [19]

Levendusky et al.

[11] Patent Number: 4,689,458
[45] Date of Patent: Aug. 25, 1987

[54] CONTAINER SYSTEM FOR MICROWAVE COOKING

[75] Inventors: Thomas L. Levendusky, Greensburg; Arthur Benson, Pittsburgh, both of Pa.

[73] Assignee: Aluminum Co. of America, Pittsburgh, Pa.

[21] Appl. No.: 887,726

[22] Filed: Jul. 21, 1986

[51] Int. Cl.$^4$ ............................................. H05B 6/80
[52] U.S. Cl. .......................... 219/10.55 E; 426/243; 99/DIG. 14
[58] Field of Search .............. 219/10.55 E, 10.55 F, 219/10.55 R, 10.55 D; 426/243, 241, 234, 107; 99/DIG. 14, 451; 126/390

[56] References Cited

U.S. PATENT DOCUMENTS

| 2,714,070 | 7/1955 | Welch | 99/221 |
|---|---|---|---|
| 3,219,460 | 11/1965 | Brown | 99/192 |
| 3,547,661 | 12/1970 | Stevenson | 99/171 |
| 3,941,967 | 3/1976 | Sumi et al. | 219/10.55 E |
| 3,985,990 | 10/1976 | Levinson | 219/10.55 E |
| 4,027,132 | 5/1977 | Levinson | 219/10.55 |
| 4,081,646 | 3/1978 | Goltsos | 426/107 |
| 4,190,757 | 7/1980 | Turpin et al. | 219/10.55 |
| 4,283,427 | 11/1981 | Winters et al. | 426/107 |
| 4,351,997 | 9/1982 | Mattisson et al. | 219/10.55 |
| 4,390,554 | 6/1983 | Levinson | 426/232 |
| 4,558,198 | 12/1985 | Levendusky et al. | 219/10.55 E |
| 4,560,850 | 12/1985 | Levendusky et al. | 219/10.55 E |

FOREIGN PATENT DOCUMENTS 1593523  7/1981  United Kingdom .

*Primary Examiner*—Philip H. Leung
*Attorney, Agent, or Firm*—Carothers and Carothers

[57]  ABSTRACT

An improved metallic food container system especially adapted for cooking dough or pastry based foodstuffs in a microwave oven and including improved configurations of microwave opaque and microwave transparent container portions as well as an improved dome or cover structure therefor.

15 Claims, 6 Drawing Figures

CONTAINER SYSTEM FOR MICROWAVE COOKING

BACKGROUND OF THE INVENTION

The present invention relates generally to metallic food containers that may be used for cooking dough or pastry based foodstuffs in either a microwave oven or in other types of conventional ovens.

As noted in prior U.S. Pat. No. 4,558,198, for example, previously it has been generally believed that metal containers should not be used to heat or cook food in microwave ovens. Bare metal containers can reflect the electromagnetic energy emanating from the magnetron tube (which supplies the energy for cooking to the oven cavity) and thereby damage same. In addition, when bare metal is disposed in close proximity to the metal walls of the microwave oven, electrical arcing may occur between the container and the oven walls. For these reasons, the industry has generally advocated using only containers of plastic, cardboard or other non-microwave reflective material to heat loads, e.g. food, in microwave ovens.

It is also known that certain exceptions to the prohibition against use of metal containers in microwave ovens are from time to time desirable. For example, to shield one food portion from another in a container and thereby effect differential heating and cooking thereof, metal containers or metallic portions thereof have been utilized to effect differential microwave energy input to the various food portions to be cooked. This has been accomplished by the use of metal containers having relatively deeper and shallower portions, for example, and/or metal strips or other shielding materials. Ferrite materials, for example, absorb microwave energy and thereby cause the metal to be heated such that cooking or heating of food in the metal container portion is effected at least in part much as it would occur in a conventional, convection or infrared radiation oven.

The above cited U.S. Pat. No. 4,558,198 discloses a metal container and system for arc-free microwave cooking and minimal reflection of electromagnetic radiation. These benefits are achieved, according to the patent, by means of structural refinements in a metallic container, including provision of smooth, wrinkle free side and bottom walls and edges, a physical geometry incorporating generous radii in lieu of sharp corners in the container structure, a coating of heat resistant plastic material of a specified film thickness on both sides of the walls and the edges of the container to diffuse microwave radiation, and a heat resistant microwave transparent lid or dome for the container.

A great many more patents address these and various other problems that have been identified in the art of microwave cooking. For example, United Kingdom Patent Specification No. 1,593,523 discloses a container for a differential heating system which comprises an open-top, tray-like body which holds one or more predetermined food items to be heated in a microwave oven, and a cover for closing the tray, with the tray and cover being formed overall from material which is transparent to microwave radiation, and having disposed thereon a layer of microwave radiation opaque material or shielding material on the parts thereof which correspond to portions of the container whose contents require reduced microwave radiation exposure during cooking. U.S. Pat. No. 4,283,427 discloses a microwave heating package incorporating a lossy chemical susceptor that is initially microwave radiation opaque but becomes substantially microwave transparent upon extended exposure to microwave radiation. U.S. Pat. No. 4,190,757 discloses a microwave heating package and method including a shield such as a foil sheet which reduces by a predetermined controlled amount the exposure of the package contents to microwave energy, the shield having openings or apertures of predetermined size to provide controlled exposure of the contents to microwave energy.

U.S. Pat. No. 3,219,460 discloses a frozen food package having a dielectric cover which overlies a shield of such material as aluminum foil, and which shield is disposed atop the package container directly beneath the top or lid therefor. The shield incorporates apertures of predetermined number, area and pattern to provide an unshielded area which permits cooking energy to penetrate into the container. U.S. Pat. No. 4,317,017 discloses a steamer for use in a microwave oven and wherein a water reservoir in the bottom of the steamer container is exposed to microwave radiation for heating of the water to produce steam. The foodstuffs to be steam cooked thereby are shielded from exposure to microwave radiation.

U.S. Pat. No. 4,351,997 discloses yet another food package comprising a tray having at least inner surfaces of the walls and rim thereof coated with microwave radiation reflecting or opaque material whereas the bottom is of microwave radiation transparent material. U.S. Pat. No. 3,854,023 and 3,985,991 disclose microwave cooking utensils which utilize metal (i.e. shielding) containers inside radiation porous closed containers to produce, condense and recycle steam by absorbing condensation and transporting it away from the low temperature surface that promotes condensation and to an elevated temperature zone for reproducing steam, this to provide improved cooking through control of the pattern of heating by use of the vapor evaporation/condensation cycle in a closed container.

U.S. Pat. No. 4,560,850 provides disclosure similar in many respects to that of the above cited U.S. Pat. No. 4,558,198, and additionally discloses a central steam port for use with a covered microwave cooking container to produce an escape passage for steam evolved during cooking of the contents, which steam then passes over surfaces of the container to heat same and thereby convey the heat energy to the foodstuffs being cooked.

Other patent references that are generally pertinent to microwave cooking techniques include U.S. Pat. Nos. 4,027,132;3,547,661;4,306,133;2,714,070;3,985,990; and 4,390,554.

In spite of extensive efforts directed toward improvement of microwave cooking systems there remains a need in the art for containers well suited for cooking of dough or pastry based foodstuffs in microwave ovens. Many such foodstuffs are packaged and sold in bare (uncoated) aluminum containers which are not suitable for microwave cooking. Prior efforts to provide packages for dough or pastry based food stuffs that are better suited for microwave cooking have produced uneconomical results and/or cooking procedures of undue complexity. There remains in the art a need for a disposable, combined food package/cooking container of economical construction which will permit simple and effective cooking of dough or pastry based foodstuffs in either a microwave oven or other conventional ovens.

BRIEF SUMMARY OF THE INVENTION

The present invention fulfills these and other objectives by providing a food package/cooking container which is an improvement over the structure disclosed in the above cited U.S. Pat. No. 4,558,198. Specifically, the invention herein incorporates a preferably disposable container structure having an inner profile which supports the food item that is packaged and cooked therein, with at least a portion of the bottom of the container being a microwave transparent medium that is bonded about its periphery to a surrounding microwave opaque portion of the container. The microwave transparent portion may be flush with the bottom of the container or may be elevated above same to create a recess beneath the microwave transparent bottom portion and to also thereby reduce the depth of the container near its center where cold spots often have developed in microwave cooking with prior containers. The container of this invention further contemplates a cover in the form of a microwave transparent dome adapted to receive therein a selectively removable microwave energy shield comprised of a metal foil facing bonded to a rigid paperboard or similar substrate, the shield having multiple apertures for controlled exposure of the contained foodstuff to microwave energy from directly above.

It is therefore one object of the present invention to provide a novel and improved shipping, storage, cooking and serving package for foodstuffs, especially dough or pastry based foodstuffs.

A more specific object of the invention is to provide such a package with a bottom surface portion comprised of a microwave energy transparent portion encompassed by a microwave energy opaque portion for selective exposure of lower surface portions and adjacent interior regions of the foodstuff to microwave radiation, and similarly a top closure or lid in the form of a dome which receives a removable laminated moderator or shield of metal foil and rigid substrate construction and including microwave energy admitting apertures or openings to permit controlled exposure of the upper surface and adjacent interior portions of the contained food item to microwave energy.

The invention thus provides for improved cooking of dough and pastry based foodstuffs in containers that are also well suited for packaging, shipping and storage of same, and in which the cooking may be effected in either a microwave oven or other conventional oven.

These and objects and further advantages of the invention will become more readily apparent upon consideration of the following detailed description and the accompanying drawings, in which.

Figure 1:
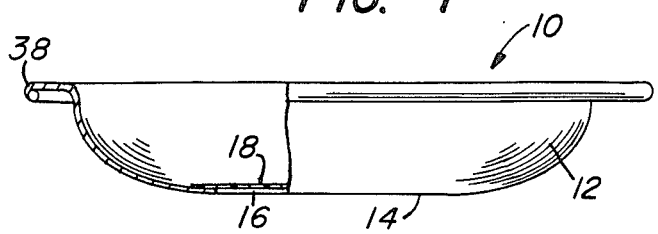
FIG. 1 is a partially sectioned side elevation of a container according to the present invention.

There is generally indicated at 10 in FIG. 1 a container for packaging, shipping, storing and cooking of a food item, especially a dough or pastry based food item, in a microwave oven. The container 10 may be similar in many respects to the container disclosed in the above cited U.S. Pat. No. 4,558,198, especially as to overall geometry, surface configuration and quality, applied surface coatings, and the like. Accordingly, the entire disclosure of the cited U.S. Pat. No. 4,558,198 is incorporated herein and made a part hereof by reference.

In addition to the structural details of the container 10 as specified in the cited U.S. Pat. No. 4,558,198, the container 10 comprises a metallic body 12 having a base or bottom portion 14 in which there is formed an enlarged aperture or opening 16. With a circular container of the dimensions specified in the cited U.S. Pat. No. 4,558,198, an opening 16 of 2.28 inches diameter, for example, would be suitable.

Figure 2:
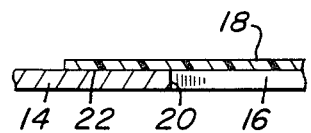
FIG. 2 is an enlarged fragmentary portion of FIG. 1.

A microwave transparent insert (e.g. polyethylene terephthalate or PET) film, or a polyester coated paperboard 18 is received in overlying relationship to aperture 16 and is sealed to base portion 14 along the perimeter 20 of aperture 16 to provide a continuous peripheral seal therebetween as indicated at 22 in FIG. 2. The bond provided at 22 between the metallic container base portion 14 and the insert 18 may be provided by any adhesive bonding agent that is suitable to withstand microwave radiation in a microwave oven, or infrared or convection heat in a conventional oven, as well as exposure to moisture, grease, and other media associated with food items generally.

The structure illustrated in FIGS. 1 and 2 permits lower surface portions and adjacent interior portions of the foodstuff packaged in container 10 to be exposed to microwave radiation which passes through the microwave transparent insert 18.

Figure 3:
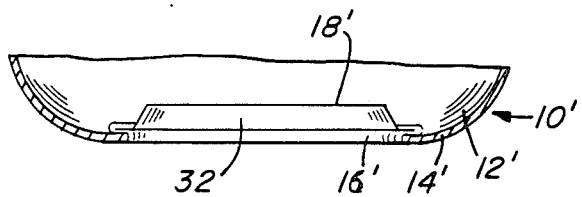
FIG. 3 is a fragmentary, sectioned side elevation similar to FIG. 1 showing an alternative embodiment of the invention.

In FIG. 3 there is shown an alternative embodiment of the invention wherein a container 10' is provided with a metallic body 12' having a base portion 14' in which there is formed an aperture 16'. A microwave transparent insert 18', similar in structure to insert 18, overlies aperture 16' and is sealed thereto by means of a crimp formed about the perimeter of aperture 16' and including a bent back portion 26 of base portion 14', and a reverse bent portion 28 thereof which overlies portion 26 and extends toward the aperture 16'. A laterally outwardly projecting flange portion 30 of insert 18' extends between base portions 26 and 28 and is sealingly engaged by crimping therebetween to provide a seal equally as effective as the bond 22 for containment of a foodstuff in container 10'. Of course, a suitable bonding agent, similar to any which would be suitable for use at 22 may also be utilized in conjunction with the FIGS. 3 and 4 embodiment in addition to the mechanical crimping disclosed.

Figure 4:
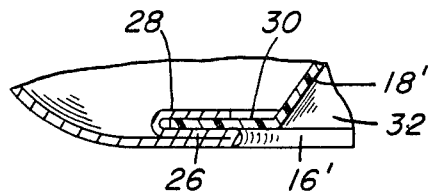
FIG. 4 is an enlarged fragmentary portion of FIG. 3.

It will also be noted that according to FIGS. 3 and 4, the insert 18' is elevated above the lowermost extent of base portion 14' to create a recess beneath same to provide a larger recess, insert 18' may be formed with an upward concavity 32. A recess 32 beneath a central portion of the container 10' reduces the central vertical thickness of the foodstuff contained within container 10'. Furthermore, heat generated from the glass plate in the bottom of a microwave oven will be trapped within recess 32 and will be radiated to the surrounding container surfaces to enhance thawing of a frozen food product and in turn reduce the time needed to heat the contents of the container 10'. Additionally, the reduced central thickness of the foodstuff helps to minimize temperature differentials which may be encountered when cooking foods in conventional microwave containers. Such temperature differentials often have been encountered in the prior art as cold spots which are located centrally of the foodstuff and which are not effectively heated by the microwave cooking process. The described container is especially well suited for cooking of dough or pastry based food items having a bottom and a top crust, for example, pot pies.

Figure 5:
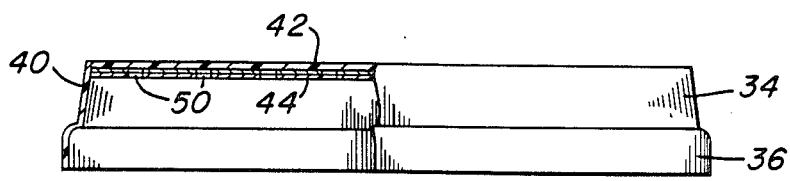
FIG. 5 is a partially sectioned side elevation of a dome or lid for the container of FIGS. 1 or 3.
Figure 6:
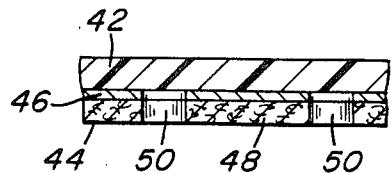
FIG. 6 is an enlarged fragmentary portion of FIG. 5.

The above described structural aspects of the invention provide for controlled microwave radiation exposure to the lower surface and adjacent interior portions of a foodstuff contained within container 10 or 10'. For control of microwave exposure of the upper surface and adjacent interior portions of the foodstuff, a microwave transparent dome or cover 34 is provided to fit atop container 10 or 10'. Cover 34 incorporates an annular skirt portion 36 which overlies a rolled rim portion 38 of a container 10 or 10' (FIGS. 1 and 3) continuously about the circumference thereof. A dome portion 40 includes a sidewall portion 41 which extends upwardly of skirt portion 36 to a transversely extending top portion 42, the skirt 36, sidewall 41 and top 42 being preferably a unitary, self-supporting structure of microwave radiation transparent material such as disclosed in above cited U.S. Pat. No. 4,558,198. As the cover 34 is microwave transparent, a shield insert 44 is provided for insertion therein to reside adjacent the underside of top portion 42 as shown in FIGS. 5 and 6. Shield 44 comprises a reflective metal surface (i.e. aluminum foil) 46 which is suitably bonded to a paperboard or cardboard substrate 48. A plurality of microwave energy emitting through apertures 50 are formed in shield 44 to permit entry of microwave radiation. The sidewall portion 41 of cover 34 also is unshielded to permit exposure of the foodstuff contained within container 10 or 10' to microwave radiation.

The shield 44 is retained in position adjacent the underside of top portion 42 as by friction between peripheral portions of shield 44 and the adjacent perimeter of the upstanding sidewall 41 of dome 40 whereby shield 44 is readily removable for use of cover 34 in conventional covered cooking of the contained foodstuff, if desired, or as a covered serving utensil.

The disclosed container and cover combination provide for selective shielding of microwave energy from a contained food product in a manner to ensure maintenance of overall temperature uniformity throughout the food product during cooking. The respective microwave transparent portions and microwave opaque portions, and the surface coatings which provide for microwave energy diffusion as described in the incorporated-by-reference patent and reiterated hereinbelow, provide a novel structure for packaging a foodstuff and for microwave cooking thereof. The package is also well suited for other conventional cooking processes (e.g. conventional baking in the case of a dough or pastry based foodstuff).

Practice of the invention involves packaging the foodstuff in a shallow metal tray with a height of no more then 1 inch and having substantially smooth and wrinkle free side and bottom walls and edges, and with a geometry incorporating a curved configuration of substantial radius for the sidewalls of the container, as seen in elevation, and with a round container configuration of substantial radius, (or rounded corners of substantial radii in a generally polygonal container), as seen in plan view. Further, the surfaces of the walls and edges of the container are coated with a layer of heat resistent plastic material of a film thickness in the order of 0.25 to 2.5 mils, the coating material being effective to diffuse and thereby prevent reflection of microwave energy from the tray. A pot pie or other dough or pastry based foodstuff is placed in the tray for packaging, shipping and storage thereof, and for subsequent cooking thereof in either a conventional or a microwave oven by the ultimate consumer.

According to the description hereinabove the present invention provides a novel and improved container system and method for packaging, storing, and cooking food stuffs in either a conventional convection oven or a microwave oven. Of course, various alternative and modified embodiments of the invention other than described hereinabove have been contemplated by the inventors, and such certainly also would occur to others skilled in the art once apprised of the invention herein. Accordingly, it is our intent that the invention be construed broadly and limited only by the scope of the claims appended hereto.

We claim:

1. In a container system for cooking foodstuffs in a microwave or a convection oven, the combination comprising:

a metal container member having a substantially smooth wrinkle-free continuously extending peripheral side wall portion that is contiguous with a substantially smooth and wrinkle-free bottom portion and further having a substantially smooth and wrinkle free peripheral edge portion extending continuously adjacent an outermost terminal portion of said sidewall portion;

said sidewall portion in elevation being provided with an outwardly and upwardly curving configuration of substantial radius to produce an overall height of said container member not exceeding one inch;

said container member in plan view being provided with a rounded configuration with substantial radius or with a polygonal configuration including rounded corners of substantial radius;

said substantial radii being sufficient to substantially reduce the concentration of microwave energy in a microwave oven environment;

said sidewall portion having both the inner and outer surfaces thereof and the edge portion thereof coated with a film of electrically insulating plastic material of a film thickness on the order of 0.25 to 2.5 mils, said plastic material being effective to withstand the heat of cooking and to diffuse and thereby prevent substantial reflection of microwave energy;

said bottom portion including an opening therein of a size to admit microwave energy and a microwave transparent insert of generally convex form overlying said opening and being affixed to said metal container continuously about the perimeter of said opening; and said microwave transparent insert being disposed with respect to said bottom portion to project upwardly within said metal container member such that said container is of a maximum interior depth outside said perimeter of said opening and is of less than said maximum depth within said perimeter of said opening.

2. The combination as claimed in claim 1 wherein said opening is located centrally of said bottom portion.

3. The combination as claimed in claim 2 wherein said plastic material coating the inside surfaces of said sidewall portion is a vinyl material.

4. The combination as claimed in claim 3 wherein said plastic material coating the outer surfaces of said sidewall portion is an epoxy material.

5. The combination as claimed in claim 4 wherein said peripheral edge portion is formed as a continuously extending rolled bead.

6. The combination as claimed in claim 5 wherein said transparent insert is sealingly affixed to said metal container by an adhesive bonding agent.

7. The combination as claimed in claim 5 wherein said transparent insert is sealingly affixed to said container by mechanical crimping of a continuously extending peripheral portion thereof intermediate overlapping layers of the metal forming said container.

8. The combination as claimed in claim 5 additionally including a heat resistant, electrically insulating, plastic, microwave transparent cover having a continuously extending peripheral skirt portion which overlaps said edge portion of said container when said cover is disposed thereon, said cover including an upstanding peripheral sidewall portion and a contiguous, transversely extending top portion.

9. The combination as claimed in claim 8 additionally including a shielding insert disposed within said cover to underlie said top portion and thereby moderate transmission of microwave energy via said top portion of said cover to the interior of said container.

10. The combination as claimed in claim 9 wherein said shielding insert is retained by frictional engagement with portions of said upstanding peripheral sidewall portion adjacent said top portion.

11. The combination as claimed in claim 10 wherein said shielding insert includes an expanse of microwave radiation reflecting medium laminated to an expanse of substantially rigid substrate.

12. The combination as claimed in claim 11 wherein said microwave reflective medium is aluminum foil and said rigid substrate is a non-microwave radiation reflective medium.

13. The combination as claimed in claim 12 wherein said shielding insert includes through apertures of a size to accommodate limited passage of microwave radiation therethrough for controlled exposure of the contents of said container to microwave radiation.

14. In a metal container for use in a microwave or convection oven as well as for packaging and storage of a foodstuff to be subsequently cooked therein in a microwave or convection oven wherein the container includes a metallic substantially smooth, wrinkle-free, continuously extending peripheral sidewall portion that is contiguous with a metallic, substantially smooth and wrinkle-free bottom portion and further having a substantially smooth and wrinkle-free peripheral edge portion extending continuously adjacent an outermost terminal portion of said sidewall portion and wherein said sidewall portion is provided in elevation with an outwardly and upwardly curving configuration of substantial radius to produce an overall height of said container member not exceeding one inch and said metal container in plan view being provided with a rounded configuration with substantial radius or with a polygonal configuration including rounded corners of substantial radius with the substantial radii being sufficient to substantially reduce the concentration of microwave energy in a microwave oven environment, and wherein said sidewall portion, including said edge portion, has both the inner and outer surfaces thereof coated with a film of electrically insulating plastic material of a film thickness on the order of 0.25 to 2.25 mils with said plastic material being effective to withstand the heat of cooking and to diffuse and thereby prevent substantial reflection of microwave energy, the improvement comprising:

said bottom portion including an opening therein of a size to admit microwave energy and a microwave transparent insert of generally convex form overlying said opening said microwave transparent insert being affixed to said metallic container continuously about said periphery of said opening and being disposed with respect to said bottom portion to project upwardly within the metal container whereby the container is of a maximum depth outside said periphery of said opening and is of a lesser depth within said periphery of said opening.

15. The improvement as claimed in claim 14 additionally including a heat resistant, electrically insulating, plastic, microwave transparent cover including a peripheral, depending skirt portion which overlaps said edge portion when said cover is placed on said container, and said cover further including a continuously extending upstanding peripheral sidewall portion contiguous with a transversely extending top portion and a microwave shielding insert received within said cover subjacent said top portion and including an expanse of microwave reflective medium laminated to an expanse of rigid structural substrate and with through aperture means of a size and configuration to admit controlled amounts of microwave radiation to exposure of the contents of said container to microwave radiation for cooking thereof.

* * * * *